United States Patent [19]
Lyon

[11] Patent Number: 6,086,254
[45] Date of Patent: Jul. 11, 2000

[54] LINEAR MOTION BEARING ASSEMBLY

[75] Inventor: Gregory S. Lyon, Mamaroneck, N.Y.

[73] Assignee: Thomson Industries, Inc., Port Washington, N.Y.

[21] Appl. No.: 09/112,848

[22] Filed: Jul. 10, 1998

[51] Int. Cl.[7] .................................................. F16C 29/06
[52] U.S. Cl. ............................. 384/12; 384/25; 384/45; 384/44
[58] Field of Search ................................ 384/12, 13, 43, 384/44, 45, 25

[56] References Cited

U.S. PATENT DOCUMENTS

| | | |
|---|---|---|
| 2,449,297 | 9/1948 | Hoffer . |
| 3,582,159 | 6/1971 | Uhtenwoldt . |
| 3,754,799 | 8/1973 | Hedberg . |
| 3,900,233 | 8/1975 | Thomson . |
| 4,351,574 | 9/1982 | Furukawa et al. . |
| 4,368,930 | 1/1983 | Duchaine . |
| 4,479,681 | 10/1984 | Suzuki ....................... 384/13 |
| 4,932,067 | 6/1990 | Pester et al. ................ 384/45 |
| 4,968,155 | 11/1990 | Bode ........................... 384/45 |
| 5,010,794 | 4/1991 | Klager ..................... 384/107 X |
| 5,104,237 | 4/1992 | Slocum ....................... 384/12 |
| 5,267,796 | 12/1993 | Nonaka et al. ........... 384/13 X |
| 5,273,364 | 12/1993 | Hara ......................... 384/45 X |
| 5,380,097 | 1/1995 | Tanaka ....................... 384/13 |
| 5,484,208 | 1/1996 | Kane et al. ................ 384/12 |

FOREIGN PATENT DOCUMENTS

| | | |
|---|---|---|
| 3326541A | 2/1984 | Germany . |
| 4227936A | 2/1993 | Germany . |
| 4237408A | 5/1993 | Germany . |
| 9311059U | 9/1993 | Germany . |
| 4311515A | 10/1994 | Germany . |
| 19538450A | 5/1996 | Germany . |
| 19647937A | 5/1998 | Germany . |

OTHER PUBLICATIONS

International Search Report PCT/US99/15520 mailed Dec. 16, 1999.

*Primary Examiner*—Thomas R. Hannon
*Attorney, Agent, or Firm*—Dilworth & Barrese

[57] ABSTRACT

A linear motion bearing assembly includes a carriage having a bearing track, a fluid inlet port and a fluid supply passage interconnecting the fluid inlet port and the bearing track. The bearing track has a load bearing portion, a return portion and a pair of turnarounds interconnecting the load bearing portion and the return portion. The carriage is supported for linear movement on a rail. A plurality of rolling elements are positioned in the bearing track and a pressurized hydrostatic fluid supply is connected to the fluid inlet port for supplying hydrostatic fluid under pressure to the bearing track.

16 Claims, 6 Drawing Sheets

LINEAR MOTION BEARING ASSEMBLY

BACKGROUND

1. Technical Field

The present disclosure relates to a linear motion bearing assembly and, more specifically, to a hybrid linear motion bearing assembly having rolling elements positioned along a bearing track and a hydrostatic fluid supply passage adapted to receive a continuous source of hydrostatic fluid. The supply passage is in fluid communication with the bearing track to provide substantially friction-less movement between relatively movable parts.

2. Background of Related Art

Linear motion bearing assemblies having rolling elements, such as balls, pins or rollers, are well known and are utilized in various industries for movement of machine parts, tools and masses. Their use is especially conspicuous in the machine tool industry, where requirements of accuracy, stiffness, reliability and repeatability are stringent. Roller bearings are characterized as having relatively high load capacity, with good characteristics of function, static stiffness and accuracy. Typically, provisions are made for the circulation of the rolling elements via bearing retainers or end caps. The rolling elements are retained between two bodies along a bearing race. The bearing race has a tendency to act as a spring when a load is applied, wherein the amount of deflection of the bearing race is a function of the applied load. When a load having an oscillatory excitation is applied to the bearing, the bearing is subject to vibration which may adversely effect the bearing life, especially in terms of wear. Vibration may also adversely affect the precision of the apparatus to which the bearing is associated. For example, in a machining application, vibration may cause degradation of the surface finish of the article being machined.

Hydrostatic bearings, although not as prevalent as rolling element bearings, are also known. Hydrostatic bearings are characterized as having excellent low friction, accuracy, and repeatability characteristics, with a theoretically infinite life. Hydrostatic bearings also have excellent damping characteristics which result from hydrostatic fluid acting as a shock absorber between the apparatus to which the bearing is associated and an applied load. However, the overall load carrying capacity of hydrostatic bearings, as well as static stiffness, are not as high as those of rolling element bearings.

Accordingly, a need exists for an improved bearing having excellent damping characteristics, a relatively high load capacity, and excellent characteristics of friction, static stiffness, accuracy and repeatability.

SUMMARY

In accordance with the present disclosure, a linear motion bearing assembly is provided which has all of the attributes of rolling element bearings and hydrostatic bearings with few of the limitations. The bearing assembly includes a carriage having a bearing track, a fluid inlet port and a fluid supply passage connecting the fluid inlet port to the bearing track. The bearing track includes a load bearing portion, a return portion and a pair of turnarounds interconnecting the load bearing portion and the return portion. A plurality of rolling elements are positioned along the bearing track and a pressurized hydrostatic fluid supply is connected to the fluid inlet port for supplying hydrostatic fluid under pressure to the bearing track. The carriage is supported on the rolling elements for linear movement along a support rail. By incorporating the features of hydrostatic fluid bearings and rolling element bearings into a single hybrid bearing, this hybrid bearing is capable of sustaining the same load capacity as conventional rolling element bearings while resisting vibration or shock caused by dynamic loading.

BRIEF DESCRIPTION OF THE DRAWINGS

Various preferred embodiments are described herein with reference to the drawings, wherein.

DETAILED DESCRIPTION OF PREFERRED EMBODIMENTS

Figure 1:
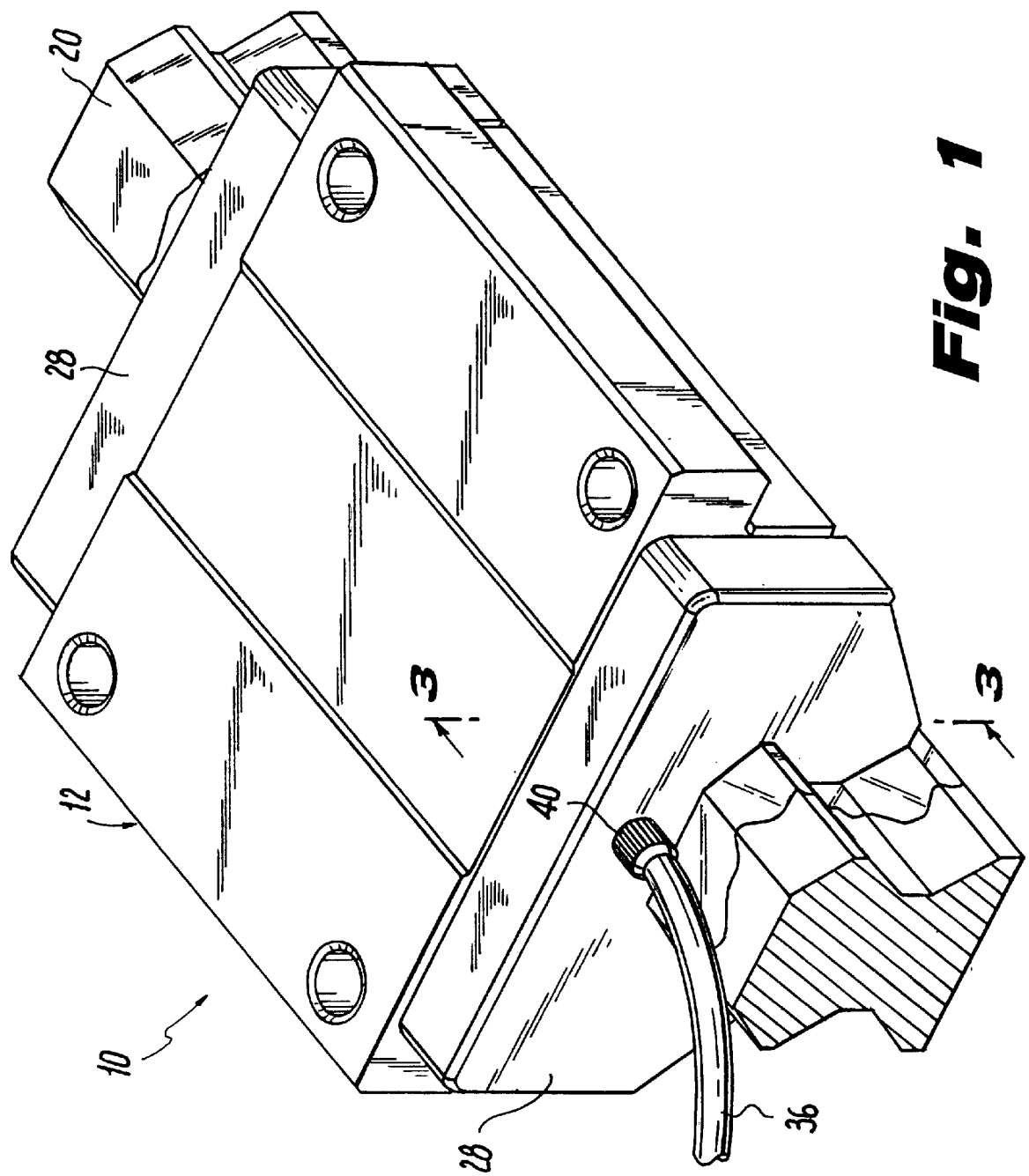
FIG. 1 is a perspective view of one embodiment of the presently disclosed linear motion bearing assembly positioned on a support rail.

Preferred embodiments of the presently disclosed linear motion bearing assembly will now be described in detail with reference to the drawings, in which like reference numerals designate identical or corresponding elements in each of the several views.

FIGS. 1–4 illustrate one embodiment of the presently disclosed linear motion bearing assembly, shown generally as 10 in FIG. 1. Briefly, bearing assembly 10 includes a bearing carriage 12 adapted to be slidably supported on a support rail 20, a pair of end caps 28, and a fluid supply hose 36. One end cap 28 is secured to each end of bearing carriage 12 using any known fastening device, e.g., threaded bolts (FIG. 2), brazing, etc. Supply hose 36 is adapted to be connected to one of the end caps 28 to supply hydrostatic fluid to bearing assembly 10.

Figure 2:
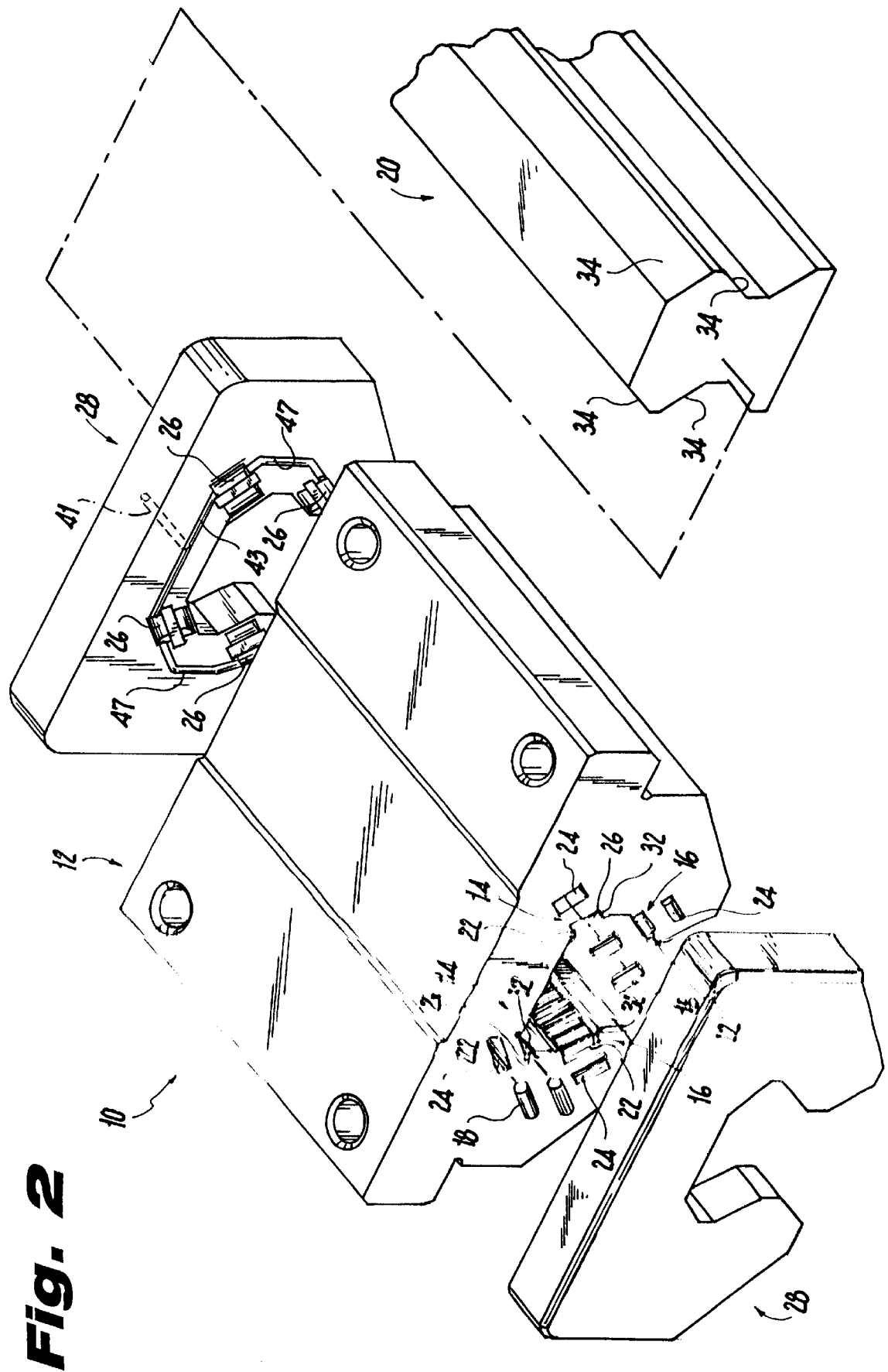
FIG. 2 is a perspective view with parts separated of the linear motion bearing assembly shown in FIG. 1.
Figure 3:
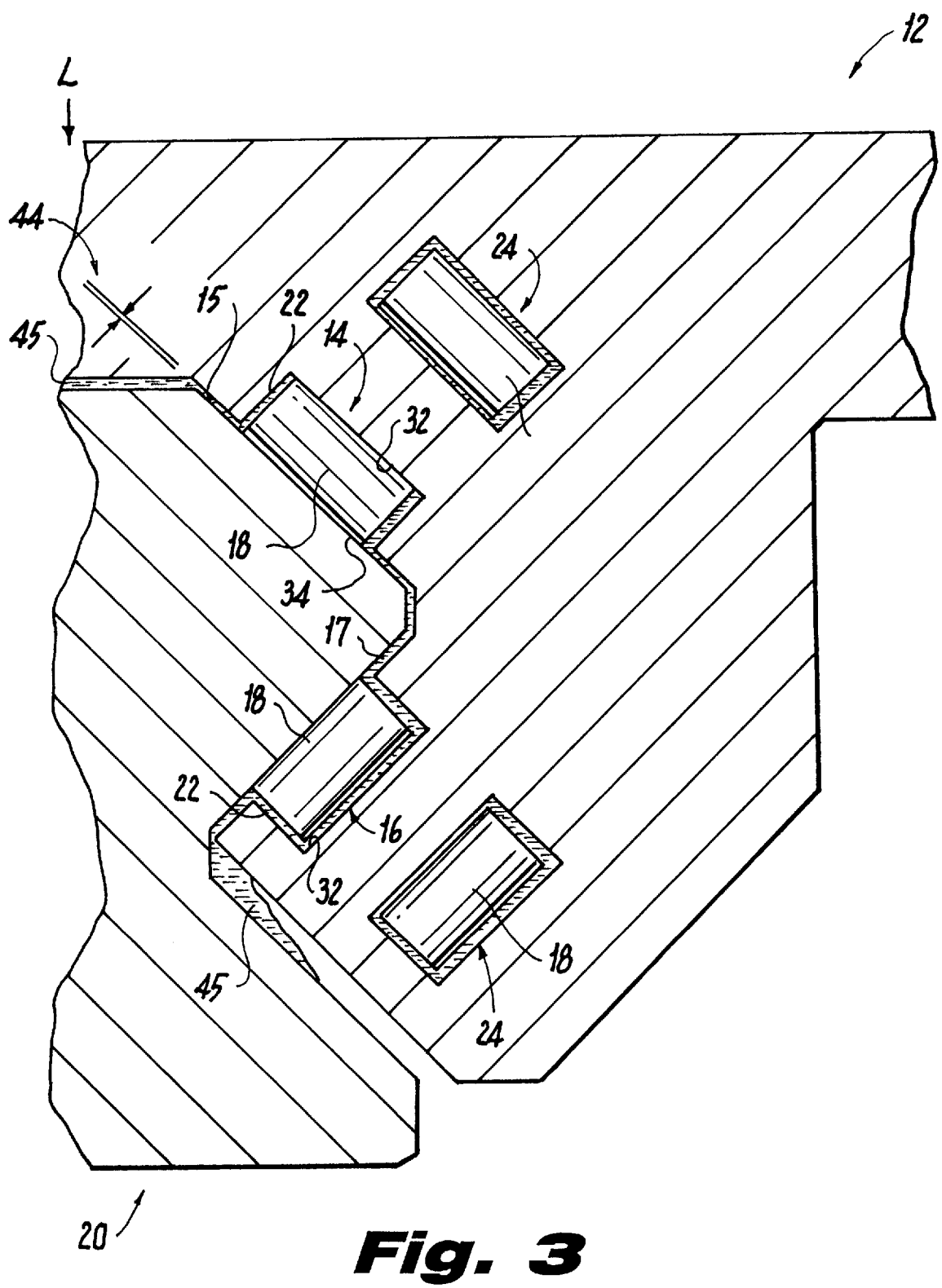
FIG. 3 is a partial cross-sectional view of the linear motion bearing assembly shown in FIG. 1.

Referring to FIG. 2, bearing carriage 12 is formed having a pair of upper and lower bearing tracks 14 and 16 which extend along upper and lower planar faces 15 and 17 (See FIG. 3) of carriage 12 and are dimensioned to receive a series of rolling elements 18. Although illustrated as being cylindrically shaped, rolling elements 18 may be constructed having any shape capable of rolling along bearing tracks 14 and 16, e.g., spherical, cylindrical, convex, concave, etc. Preferably, upper planar face 15 is angled downwardly at an angle of approximately 45° towards the centerline of carriage 12 while lower planar face 17 is angled upwardly at an angle of approximately 45° towards the centerline of the carriage. Alternately, other bearing carriage configurations may be used.

Figure 4:
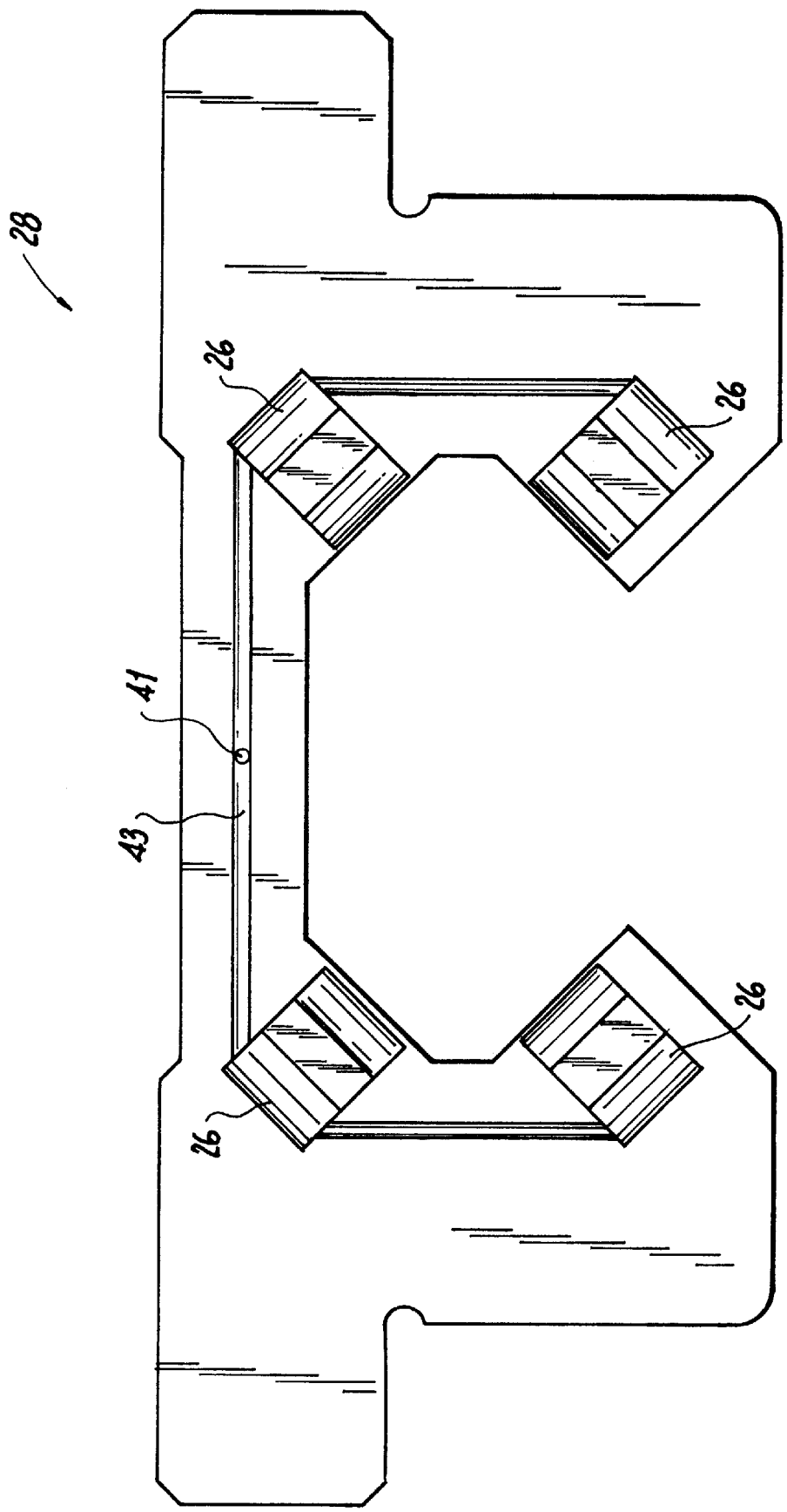
FIG. 4 is a side view of one of the end caps of the linear motion bearing assembly shown in FIG. 1.

Each of the upper and lower bearing tracks 14 and 16 includes a load bearing track portion 22 and a return track portion 24 interconnected by first and second semicircular turnaround track portions 26 (See also FIG. 4). Turnaround track portions 26 are preferably formed in end caps 28. Load bearing track portion 22 includes a carriage race 32 upon which carriage 12 and any load applied thereto is movably supported. In the assembled condition, carriage races 32 are positioned opposite rail races 34 formed on support rail 20. Rolling elements 18 are positioned to move between carriage race 32 and rail race 34 and circulate throughout return track portion 24 and first and second turnaround track portions 26. See also FIGS. 3 and 4. The diameter of roller elements 18 must be larger than the distance between carriage race 32 and rail race 34 to prevent carriage 12 from engaging support rail 20.

Referring to FIGS. 1–4 each supply hose 36 is adapted to be connected to an inlet fitting 40 secured to one of end caps 28. Inlet fitting 40 communicates inlet channel 41 (FIG. 2) which communicates with first supply channel 43. Supply channel 43 communicates with upper turnaround track portions 26 to supply fluid to the upper bearing tracks 14. Second supply channels 47 extend between the upper and the lower turnaround track portions 26 to supply fluid to the lower bearing tracks 16. Fluid entering turnaround track portions 26 from supply channel 43 flows through turnaround track portions 26 around rolling elements 18 and into upper and lower bearing tracks 14 and 16.

Bearing assembly 10 does not require high pressure fluid to effect its desired performance. Thus, hydrostatic fluid may be diverted from existing fluid supplies to the bearing assembly. Leakage gaps 44 defined between carriage 12 and rail 20 permit a restricted amount of hydrostatic fluid 45 to flow from the bearing tracks. Fluid 45 exiting from gaps 44 is collected and returned to the bearing assembly and/or a collection tank (not shown).

In operation, carriage 12 is positioned on support rail 20, and hydrostatic fluid 45, e.g., water based emulsions or standard hydraulic fluid, is supplied through inlet fitting 40 to upper turnaround track portions 26 via inlet channel 41 and first supply channel 43 to charge upper bearing tracks 14. Fluid flows from upper turnaround track portions to lower turnaround track portions via second supply channels 47 to charge lower bearing tracks 16. The hydrostatic fluid pressure in bearing assembly 10 is maintained at a constant predetermined pressure, preferably in the range of approximately 3 bar to approximately 100 bar. The carriage 12 can now be moved along support rail 20 with a load "L" (FIG. 3) applied thereto. Because of the combination of hydrostatic fluid and rolling elements, bearing is capable of sustaining the same load capacity as conventional rolling element bearings, while resisting vibration or shock caused by dynamic loading.

Support rail 20 may be manufactured using conventional methods to produce a hardened and ground monolithic structure. Carriage 12 may also be manufactured as a monolithic structure using conventional techniques by grinding to provide carriage races 32 and to provide appropriately dimensioned leakage gaps 44, which preferably are about 10μ to about 100μ but may vary in dimension depending upon the pressure and type of hydrostatic fluid being used and the stiffness required by the load. Alternately, multipart carriage and/or rail construction are envisioned. End caps 28 are formed from a material, such as plastic, nylon, decrin, etc . . . , and are fastened to carriage 12 as discussed above.

Figure 5:
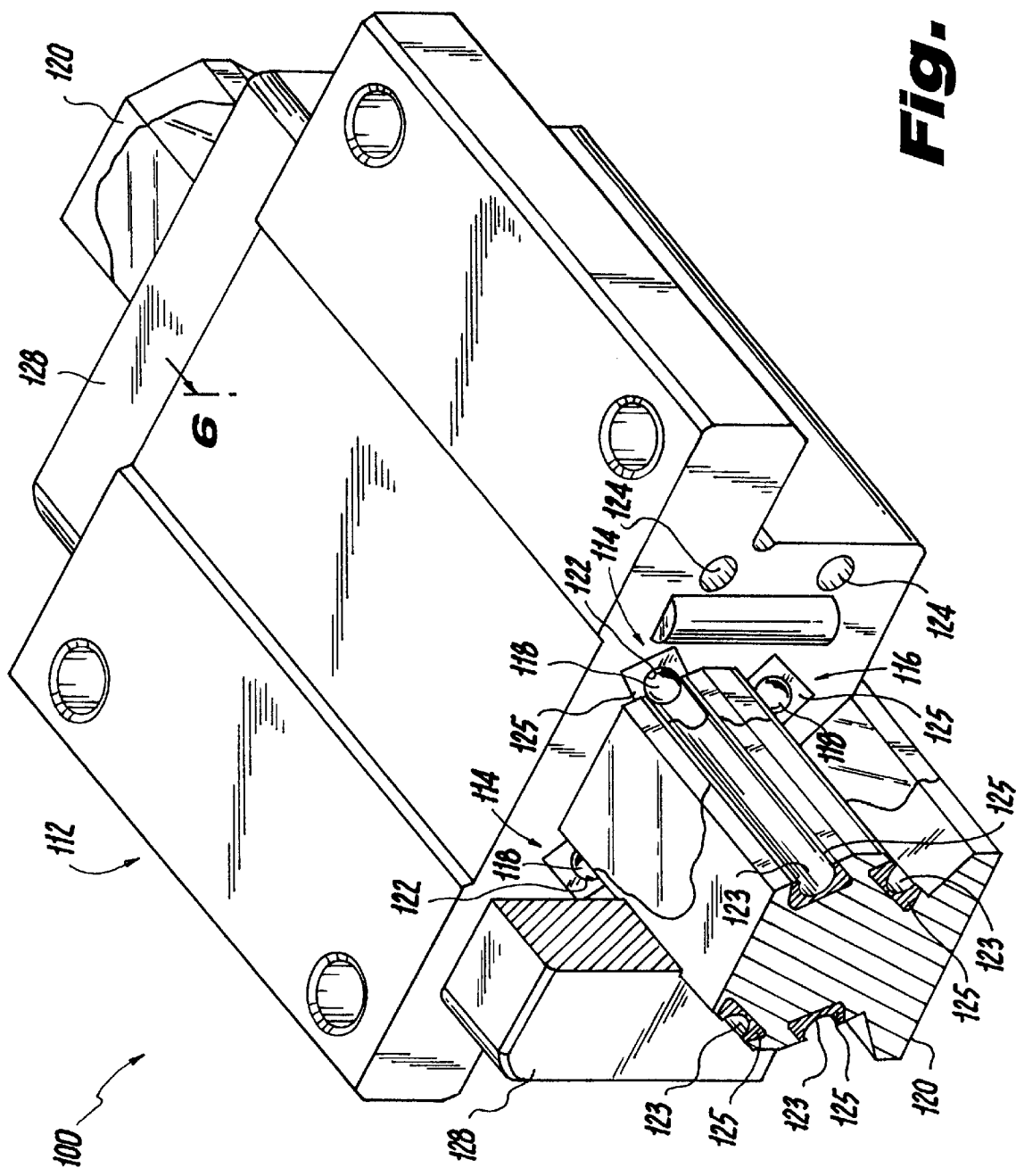
FIG. 5 is a partial cross-sectional perspective view of an alternate embodiment of the presently disclosed linear motion bearing assembly positioned on a support rail.
Figure 6:
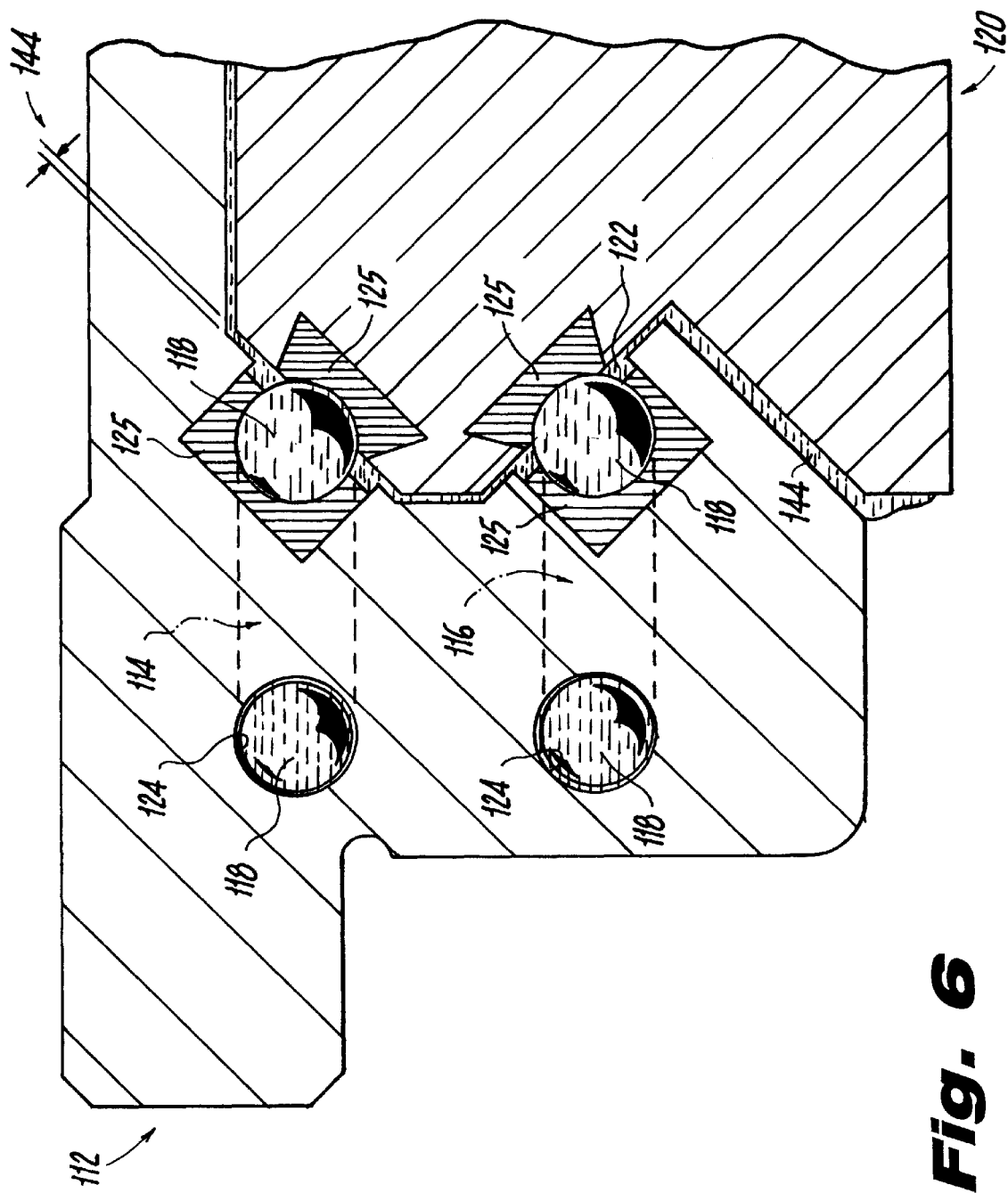
FIG. 6 is a partial cross-sectional view of the linear motion bearing assembly shown in FIG. 5.

FIGS. 5 and 6 illustrate an alternate embodiment of the linear motion bearing assembly, shown generally as 100. Briefly, bearing assembly 100 includes a bearing carriage 112 configured to be supported on support rail 120, a pair of end caps 128, and a supply hose (not shown). Bearing carriage 112 includes an upper and a lower pair of bearing tracks 114 and 116, respectively. Each bearing track 114 and 116 is dimensioned to receive rolling elements 118. Although rolling elements 118 are illustrated as being spherically shaped, other element shapes are envisioned including cylindrical, convex, concave, etc.

Each bearing track 114 and 116 includes a load bearing track portion 122 and a return track portion 124 interconnected by turnaround track portions formed in end caps 128 (See FIG. 2, No. 26). Load bearing portions 122 are positioned adjacent to respective races 123 formed on support rail 120. Each load bearing track portion 122 is formed with an insert member 125 which is fastened in a respective groove formed in bearing carriage 112. Insert member 125 is constructed from a hardened material resistant to wear, i.e., stainless steel, and may be fastened to carriage 112 via any known means including press-fitting, brazing, welding, crimping, interlocking members, adhesives, etc. Rail races 123 of support rail 120 may also include insert members 125 which are resistant to wear. Alternately, upper and lower bearing tracks 114 and 116 and/or support rail 120 can be monolithically formed with bearing tracks machined directly in the carriage and/or rail, i.e., no insert need be provided.

Hydrostatic fluid is supplied to one of the end caps 128 from a constant pressure source of hydrostatic fluid (not shown) via a supply hose and into the upper and lower bearing tracks as discussed above with respect to bearing assembly 10. The fluid supply is maintained under constant pressure to fill the space surrounding rolling elements 118 and defining upper and lower bearing tracks 114 and 116 to force fluid to exit leakage gaps 144.

It will be understood that various modifications may be made to the embodiments disclosed herein. For example, the shape of the carriage and support rail need not be as illustrated and described herein. Rather, the carriage and support rail may take on any shape capable of conforming to the teachings herein. Further, the supply passages need not communicate directly with the return track portion, but, may communicate with any part of the bearing track. Therefore, the above description should not be construed as limiting, but merely as exemplifications of preferred embodiments. Those skilled in the art will envision other modifications within the scope and spirit of the claims appended thereto.

What is claimed is:

1. A linear motion bearing assembly comprising:

a support rail having at least one rail race;

a carriage having at least one carriage race and at least one bearing track, a fluid inlet port adapted to receive a continuous source of pressurized hydrostatic fluid, and a fluid supply passage interconnecting the fluid inlet port and at least one bearing track, the at least one bearing track having a load bearing portion, a return portion and a pair of turnaround portions interconnecting the load bearing portion and the return portion; and a plurality of rolling elements positioned along the bearing track, the rolling elements being adapted for longitudinal movement relative to the support rail and being positioned between the rail race and the carriage race to define a leakage gap therebetween, the leakage gap being of a dimension to generate hydrostatic pressure within the at least one bearing track when a source of hydrostatic fluid is provided therein.

2. A linear motion bearing assembly according to claim 1, wherein the at least one bearing track includes first and second upper bearing tracks.

3. A linear motion bearing assembly according to claim 2, wherein the at least one bearing track further includes first and second lower bearing tracks.

4. A linear motion bearing assembly according to claim 3, wherein the load bearing portion of each of the bearing tracks defines an angle of about 30 degrees to about 60 degrees with respect to a vertical plane extending through the longitudinal centerline of the carriage.

5. A linear motion bearing assembly according to claim 1, wherein the leakage gap is from about 10μ to about 100μ.

6. A linear motion bearing assembly according to claim 5, wherein the leakage gap is approximately 25μ.

7. A linear motion bearing assembly comprising:
- a carriage having at least one bearing track, a fluid inlet port and a fluid supply passage interconnecting the fluid inlet port and the at least one bearing track, the at least one bearing track having a load bearing portion, a return portion and a pair of turnarounds interconnecting the load bearing portion and the return portion;
- a support rail for supporting the carriage;
- a plurality of rolling elements positioned along the at least one bearing track; and
- a pressurized hydrostatic fluid supply connected to the fluid inlet port for supplying hydrostatic fluid to the at least one bearing track, wherein the hydrostatic fluid is a water based emulsion.

8. A linear motion bearing assembly comprising:
- a carriage having at least one bearing track, a fluid inlet port and a fluid supply passage interconnecting the fluid inlet port and the at least one bearing track, the at least one bearing track having a load bearing portion, a return portion and a pair of turnarounds interconnecting the load bearing portion and the return portion;
- a support rail for supporting the carriage;
- a plurality of rolling elements positioned along the at least one bearing track; and
- a pressurized hydrostatic fluid supply connected to the fluid inlet port for supplying hydrostatic fluid to the at least one bearing track, wherein the rolling elements provide a mechanical advantage to the bearing assembly and the hydrostatic fluid supply provides a hydrostatic advantage to the bearing assembly.

9. A linear motion bearing assembly according to claim 8, wherein the hydrostatic fluid supplied to the bearing track is continuously maintained at a predetermined pressure within the bearing track.

10. A linear motion bearing assembly according to claim 9, wherein the predetermined pressure is from about 3 bar to about 100 bar.

11. A linear motion bearing assembly according to claim 8, further comprising at least one leakage gap defined between the carriage and the support rail adjacent each bearing track.

12. A linear motion bearing assembly according to claim 11, wherein the leakage gap is from about 10μ to about 100μ.

13. A linear motion bearing assembly according to claim 12, wherein the leakage gap is approximately 25μ.

14. A linear motion bearing assembly according to claim 8, wherein the at least one bearing track includes two upper bearing tracks.

15. A linear motion bearing assembly according to claim 14, wherein the at least one bearing track further includes first and second lower bearing tracks.

16. A linear motion bearing assembly according to claim 15, wherein each of the bearing tracks defines an angle from about 30 degrees to about 60 degrees with respect to a vertical plane extending through the longitudinal centerline of the carriage.

* * * * *